US008909618B1

(12) United States Patent
Bushman et al.

(10) Patent No.: US 8,909,618 B1
(45) Date of Patent: Dec. 9, 2014

(54) MULTI-STEP PLATFORM FOR IMAGE CAPTURE AND ACTION

(75) Inventors: Serge J. L. Bushman, Overland Park, KS (US); Michael A. Gailloux, Overland Park, KS (US); Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1603 days.

(21) Appl. No.: 12/193,878

(22) Filed: Aug. 19, 2008

(51) Int. Cl.
*G06F 7/00* (2006.01)
(52) U.S. Cl.
USPC .......................................................... 707/711
(58) Field of Classification Search
USPC .......................................................... 707/711
See application file for complete search history.

(56) References Cited

U.S. PATENT DOCUMENTS

2006/0065733 A1* 3/2006 Lee et al. ................. 235/462.01

OTHER PUBLICATIONS

Newton, Harry, "Session" definition, Newton's Telecom Dictionary, Mar. 2007, p. 828, Flatiron Publishing, US.
"Session" definition, Technology Dictionary, http://www.techdict.org/define/session, Aug. 3, 1997, Art Branch, Inc.
"Session" definition, SearchSOA.com, http://www.searchsoa.techtarget.com/definition/session, Apr. 16, 2001, TechTarget.

* cited by examiner

*Primary Examiner* — Truong Vo

(57) ABSTRACT

A system is provided. The system comprises an at least one computer system, a services database, and an application that, when executed on the at least one computer system, receives a message containing information about a digital image, the information containing a request for a service. The application also transmits an image translation request, wherein the image translation request includes the information. The application also receives a translation containing a service code, validates the services to be provided associated with the service code based on information in the services database, and when validation succeeds, provides a communication service, wherein digital images are associated with the provision of services based on information in the services database.

20 Claims, 5 Drawing Sheets

FIG. 4
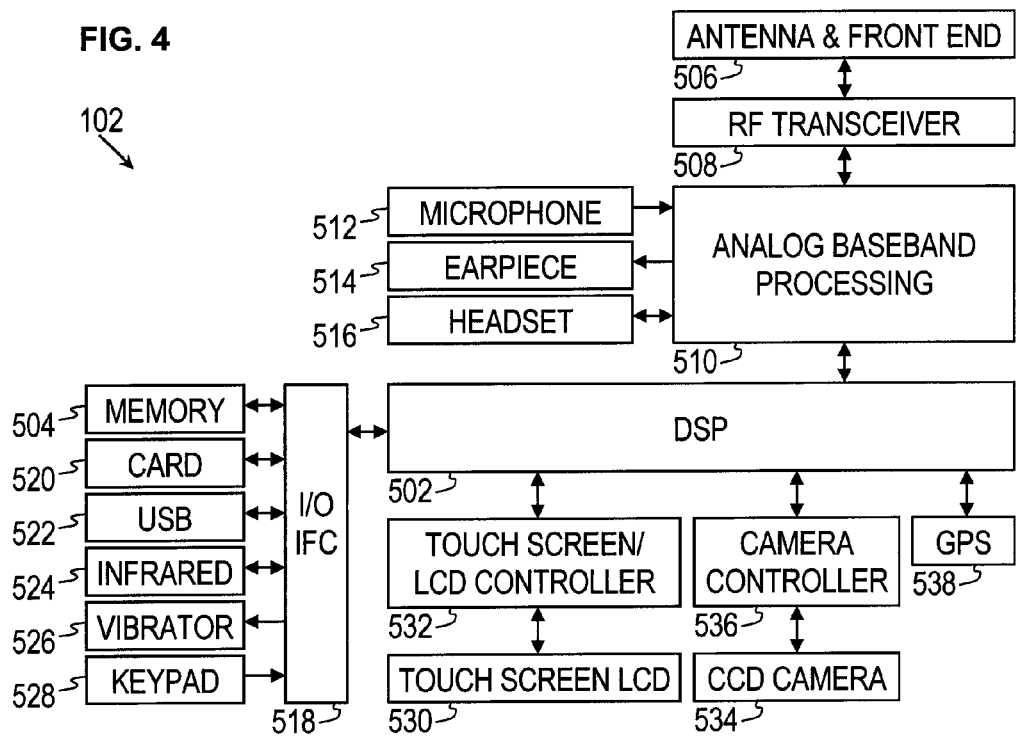
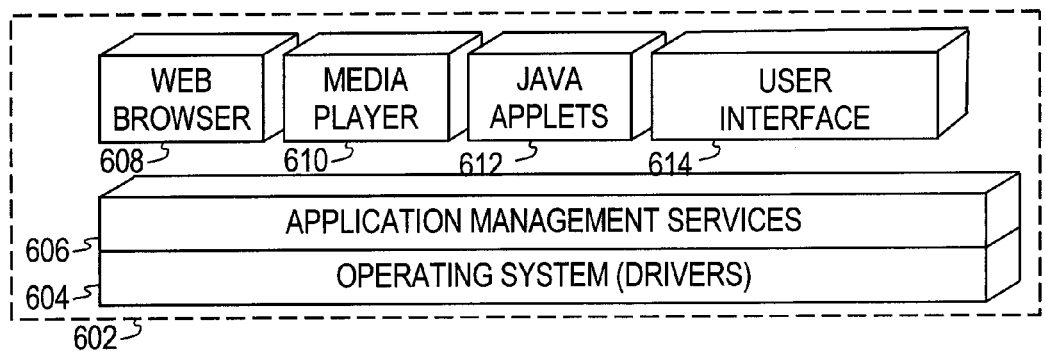
FIG. 5

MULTI-STEP PLATFORM FOR IMAGE CAPTURE AND ACTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Scanning technology promotes associating a graphical image, for example a one-dimensional bar code, a two-dimensional bar code, a circular bar code, a ShotCode, a SEMACODE, or other to a reference or other code. The reference or other code may be used to access additional information associated with the graphical image.

SUMMARY

In an embodiment, a system is provided. The system comprises an at least one computer system, a services database, and an application that, when executed on the at least one computer system, receives a message containing information about a digital image, the information containing a request for a service. The application also transmits an image translation request, wherein the image translation request includes the information. The application also receives a translation containing a service code, validates the services to be provided associated with the service code based on information in the services database, and when validation succeeds, provides a communication service, wherein digital images are associated with the provision of services based on information in the services database.

In another embodiment, a system is provided. The system comprises a server that hosts an image capture and action application and at least one service requester device. The system also comprises at least one service provider device, wherein the server promotes communication services, wherein the service requester device captures a digital image and electronically transmits the digital image to the image capture and action application, wherein the image capture and action application transmits a translation request to an images server, receives a service code, and associates the service code with a communication service offered by the service provider device, and wherein the image capture and action application initiates at least one of a voice and a data session between the at least one service requester device and the at least one service provider device.

In another embodiment, a method of providing communications services is provided. The method comprises receiving a digital image captured via one of scanning and photographing by a service requester device, submitting the received image to an image translation server for decoding and associating with a service code, and associating the service code with services requested by the service requester device. The method also comprises obtaining information comprising at least one of an identifying information and authenticating information from the first service requester device and initiating a session between the first service requester device and a service provider device. The method also comprises directing a session that comprises including at least one of admitting an additional service requester device after the session has begun, causing a data session to be initiated between the service requester device and the service provider device to supplement an ongoing voice session, and directing the passing of security information between service requester devices and service provider devices. The method also comprises terminating the session.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a block diagram of a mobile device according to an embodiment of the disclosure.

FIG. 5 is a block diagram of a software configuration for a mobile device according to an embodiment of the disclosure.

DETAILED DESCRIPTION

Figure 1:
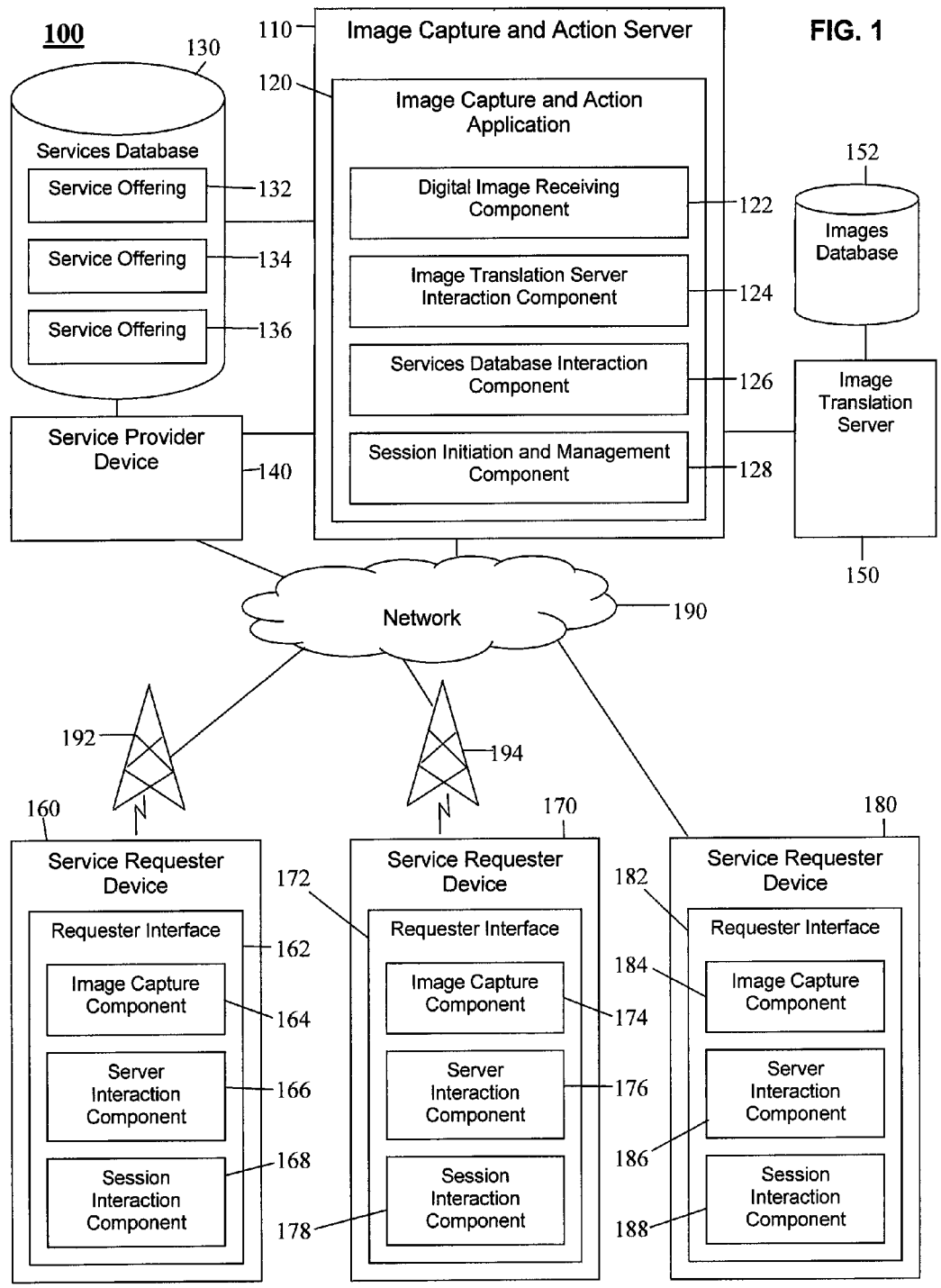
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Image recognition technology permits users of portable telephones to photograph an object, transmit the photograph or image, and receive in reply a promotional item or music, video, or other electronic snippet to play. Vendors and promoters use the technology to connect with individual users to establish contact, build brand loyalty, and gather marketing information. Interactions using the technology begin with a single transmission originated by the user of the portable phone and replied to by a promoter with electronic content. The promoter will often induce the user to continue communication by providing further incentives. Communication is limited to bilateral exchanges of information between promoters and individual portable phone users, often youthful consumers. Token incentives are often tendered by promoters in exchange for users divulging consumer data or participating in promotions. The technology has allowed promoters to build marketing links with consumers previously reachable via the Internet that have transitioned to portable devices instead of personal computers for casual, everyday communication.

Several embodiments of a multi-step platform for image capture and action allow communications devices, for example mobile telephones, to capture and transmit digital images and, upon validation, be admitted into a communication session with a provider of services and possibly other communications devices. In some contexts, a communication session may also be referred to as a session. The system comprises a server that hosts an image capture and action application. The image capture and action application receives digital images transmitted by mobile telephones and other devices requesting services associated with the images. The digital images may be circular, colored, one-dimensional, or two-dimensional barcodes made available to mobile telephone phone users to initiate requests for service under service offerings sponsored by a service provider. The mobile telephones scan or photograph the circular or two-dimensional barcodes and transmit the images of the barcodes to the application. The image capture and action application submits the images to an image translation server that searches an image database for images files that match the digital images received from the communications devices. Upon locating a match, the translation server transmits a corresponding service code back to the application. The image capture and action application then accesses a service offerings database and locates a service offering corresponding to the service code. The service code links the user of the mobile telephone or other device with the desired service offering. After any further necessary validation of the party that submitted the digital image using the communications device, the image capture and action application may initiate a communication session between the requesting party, or service requester, and the provider of services corresponding to the image captured by the service requester. The service requester may then transact or communicate directly with the service provider. The image capture and action application may also link the service requester with other service requesters in communication sessions. The image capture and action application maintains contact with the parties in the session and may admit additional parties during the session and push media to the parties including audio, video, and text-based media.

The service offering made available by the service provider is accessed by service requesters that submit a qualified digital image associated with the service offering. The service offering defines the type of service requesters and, in some embodiments, defines the identity of specific service requesters that are authorized to request and be granted services. The service offering also describes the specific services available, applicable service levels, and security restrictions. In some embodiments, two or more service requesters may be joined in a voice conference call or text chat session. Such gatherings may be arranged on an ad hoc basis to conduct a meeting about a specific confidential subject by selected service requesters that receive a digital image beforehand in an electronic mail. Authentication such as providing passwords may be required. Less formal impromptu voice conference gatherings could take place among students who may scan an image for admission into voice conference sessions during specific time periods to discuss academic material, for example. The image capture and action application may distribute software applications related to the conference topic, data, and server or Internet links to participants in a group conference session or it may cause the service provider creating a conference bridge to do the same. The image capture and action application may initiate the installation of software on service requester devices and may also cause the software to be uninstalled at the close of a session.

In another embodiment, the image capture and action application may involve the service provider in a more interactive role in a communication session with a service requester. For example, a customer in a retail store examining electronic products on display may have technical or product-availability questions beyond the knowledge of in-store personnel. With his or her portable phone, the customer photographs a circular or two-dimensional barcode on the store display and transmits the image of the barcode to a telephone number provided by the store. The image capture and action application initiates a communication session between the customer, who is the service requester in this embodiment, and the retailer's customer support personnel, the service provider. The interaction may involve a voice session but may also involve a simultaneous data session in which the retailer furnishes product or other information to the customer.

The image capture and action application may actively participate in a communication session to coordinate the ongoing flow of communication between the service provider and a service requester. A person seeking to enter a secure building may scan barcode affixed outside the building's entrance and transmit the image to the image capture and action application. The image capture and action application connects or couples the service requester with the building's security function, the service provider, in a secure session in which security-related exchanges take place. The application may play an active role in the authentication process, including providing software security keys to the service requester at the direction of the service provider. The image capture and action application may create, manage, and tear down a virtual private network session between the service provider and the service requester, including the deletion of security information from the service requester device at the conclusion of the session.

The nature of the communication session initiated and monitored by the image capture and action application depends on the type of service desired by the service requester, the services provided by the service provider in its service offering on file with the application, and the digital image submitted to the application by the service requester. The service offering on file with the application describes the services available. Service requesters qualified to receive services under the service offering may present a valid digital image to the application to be provided the desired services. The service offering dictates the parameters of the communication session that the application creates between the service provider and the one or more service requesters. The application monitors the interaction between the components and oversees the integrity and security of the session.

The embodiments of a multi-step platform for image capture and action enable multiple parties to be joined in voice and/or data communication sessions. Embodiments permit sequencing multiple participants with interaction and exchange of media taking place on an ad hoc basis during the session. Embodiments additionally permit different levels of security to be requested and enforced as required for specific exchanges during the session.

Turning to FIG. 1, a system 100 of a multi-step platform for image capture and action is described. The system 100 comprises an image capture and action server 110, an image capture and action application 120, a services database 130, a service provider device 140, an image translation server 150, an images database 152, a service requester device 160, a network 190, and a wireless base station 192. Embodiments of the system 100 typically comprise an indefinite number of additional service requester devices 170 and 180. Embodiments of the system 100 also typically comprise additional wireless base stations 194. Embodiments of the system 100 may also involve a plurality of additional service provider devices 140.

The image capture and action server 110 may be any general purpose computer system, as discussed in greater detail hereinafter. The image capture and action server 110 may comprise one computer or a plurality of computers, for example a server farm wherein many server computers cooperate to share a processing load. The image capture and action server 110 may comprise a plurality of computers that are located at different places, for example to provide geographical diversity and increased service reliability. The image capture and action server 110 executes one or more applications that provide services to the service provider device 140 and to at least one of the service requester devices 160, 170, 180 including hosting of the image capture and action application 120.

The image capture and action application 120 executes on the image capture and action server 110 and initiates, directs, and terminates communication sessions between service requester devices 160, 170, 180 and the service provider device 140. The image capture and action application 120 may comprise a digital image receiving component 122 that receives messages from service requester devices 160, 170, 180 containing photographs of digital images taken and transmitted by the service requester devices 160, 170, 180. The image capture and action application 120 may also comprise an image translation server interaction component 124 that interacts with the image translation server 150 to translate the digital image received from the service requester devices 160, 170, 180 to a code or service code of a service. The image capture and action application 120 may also comprise a services database interaction component 126 that accesses service offerings stored on the services database 130 and searches for one or more service offerings that correspond to the service code associated with the digital image received from the service requester devices 160, 170, 180. The image capture and action application 120 may enter into a multiple step exchange with the service requester devices 160, 170, 180 after an image has been translated to a service code and eligibility verified for corresponding service to secure further authentication, communicate and receive one or more service level alternatives, and gather other data from the service requester before the communication session begins. The image capture and action application 120 may also comprise a session initiation and management component 128. Having verified availability of service to the service requester devices 160, 170, 180, the session initiation and management component 128 initiates the communication session by bringing the service provider device 140 into contact with the at least one of the service requester devices 160, 170, 180 that had submitted the image and requested service. In some embodiments, one or more of the components 122-128 may be combined together.

The interactions and level of involvement of the image capture and action application 120 with the service provider device 140 and the at least one of the service requester devices 160, 170, 180 before, during, and at the conclusion of the communication session depend on the service accessed. Once a communication session has begun, the image capture and action application 120 may be only marginally involved, for example as in the case of a voice conference call between service requester devices 160, 170, 180, or it may be actively involved, for example as in the case of simultaneous voice and data sessions between a customer in a retail store interactively exchanging information with the store chain's support people located elsewhere. In some embodiments, the interactions of the session may be directed by the service provider device 140. In other embodiments, the service provider device 140 and the image capture and action application 120 may remain largely passive during the session while the service requester devices 160, 170, 180 interact with one another in a group voice and/or data session. The image capture and action application 120 contains the functionality to determine actions required of it by examining the specific service offering in the services database 130 corresponding to the digital image received and verified. The instructions contained in the service offering and any specific level of permissions associated with the service requester devices 160, 170, 180 for that session provide the framework for the interactions of the image capture and action application 120 with the other components of the system 100.

The services database 130 contains service offerings 132, 134, 136 made available by the service provider device 140. The service offerings 132, 134, 136 describe services that qualified service requester devices 160, 170, 180 may access by photographing and submitting digital images to the digital image receiving component 122. The services database interaction component 126 receives a service code corresponding to the digital image received by the digital image receiving component 122 and processed by the image translation server interaction component 124. The services database interaction component 126 consults the services database 130 for a service offering 132, 134, 136 corresponding to the service code. The service offering 132, 134, 136 contains instructions for the image capture and action server 110 and the service provider device 140 for initiating the communication session enabled by the service offering 132, 134, 136. The instructions may call for further information to be collected from the service requester devices 160, 170, 180 before the session can be commenced such as additional authenticating information or perhaps payment. Instead of gathering information, the instructions may alternatively direct the image capture and action application 120 and the service provider device 140 to push digital content to the service requester devices 160, 170, 180 such as a software application, documents, data, streaming media, server or Internet links to other material, or further instructions.

While the services available under the service offerings 132, 134, 136 contained in the services database 130 are originated and legally offered and performed by the service provider device 140, in an embodiment the services database 130 is administered by and in the control of the image capture and action server 110. In an embodiment, the party operating the image capture and action server 110 is separate from the party operating the service provider device 140. While the services offered in individual service offerings 132, 134, 136 may be provided by the service provider device 140, the delivery of at least some of the services may be performed by the image capture and action application 120.

The service offerings 132, 134, 136 may be offered by separate service provider devices 140. For example, the service provider devices 140 may comprise a telecommunications services provider, a retailer of electronics goods, and a real estate property management company, each providing services different from one another. Their individual services are described in detail in the service offerings 132, 134, 136. In an embodiment, the image capture and action server 110 performs session creation and management services at the direction of and in cooperation with the service provider device 140 as detailed in the individual service offerings 132, 134, 136. The image capture and action server 110 consults and takes direction from the contents of the individual service offerings 132, 134, 136 in creating and managing communication sessions but the performance of the actual services delivered in communication sessions may be the responsibility of the service provider device 140. The image capture and action server 110 receives service offerings 132, 134, 136 from the service provider device 140 and posts the service offerings 132, 134, 136 to the services database 130. The services database 130 may be implemented in a variety of manners known to those skilled in the art, including as a relational database, as an object-oriented database or according to some other data storage/access principles.

The service provider device 140, as previously described, is a vendor or other provider of services that in the system 100 provides its services to service requester devices 160, 170, 180 under the service offerings 132, 134, 136 in communication sessions created by the image capture and action server 110. The image capture and action server 110 enables communication sessions between the service provider device 140 and the service requester devices 160, 170, 180. The service provider device 140 works in cooperation with the image capture and action server 110. The specific character and level of involvement of either component in a session of service delivery in the system 100 depends on the kind of the services being delivered in that particular session. The service provider device 140 makes the service offerings 132, 134, 136 available to the service requester devices 160, 170, 180 through the placement or conveyance of digital images such as circular or two-dimensional barcodes. Service requester devices 160, 170, 180 wishing to engage system 100 to establish contact with the image capture and action server 110, request services available in the service offerings 132, 134, 136, engage the service provider device 140, and receive services initiate the process by photographing or scanning and transmitting the digital images associated with the desired services.

For purposes of the present disclosure, the term photographing as used in connection with the capturing digital images refers to a service requester device 160, 170, 180 taking a digital picture of or electronically scanning a one-dimensional bar code, a two-dimensional bar code, a circular bar code, a ShotCode, a SEMACODE, or other image and/or pattern imprinted on an object. Such codes may be marked onto objects with various methods familiar to those skilled in the art including industrial ink-jet, dot-peen marking, laser marking, electrolytic chemical etching (ECE), and by other methods. In an embodiment a service requester device 160, 170, 180 may be a mobile telephone with photographing capability. A user may photograph and transmit a digital image using a mobile telephone to the image capture and action application 120 to gain entry to a building. In another embodiment a service requester device 160, 170, 180 may be a desktop computer with an electronic scanner attached as a peripheral device. A user seated at the desktop computer may scan a digital image imprinted on a paper document inviting the user to join a secure group business data chat session at an appointed time.

The image translation server 150 receives digital images and/or associated metadata from the image translation server interaction component 124 of the image capture and action application 120. The image translation server 150 maintains an images database 152 containing digital images and/or associated metadata. The image translation server 150 searches the images database 152 for a file or other information that matches the digital image and/or associated metadata submitted to it by the image translation server interaction component 124. The image translation server 150 communicates the results of its search back to the image translation server interaction component 124. If the search successfully discovers a match in the images database 152 for the digital image received, a service code corresponding to the matched digital image is provided by the image translation server 150 back to the image translation server interaction component 124. In some contexts, this process may be referred to as translation of the image to a service code or simply translation. In an embodiment, the image translation server 150 may be operated by a third party. In an embodiment, the image translation server 150 may provide services to entities not contained in the system 100. The images database 152 may be implemented in a variety of manners known to those skilled in the art, including as a relational database, as an object-oriented database or according to some other data storage/access principles.

The service requester device 160, 170, 180 is an electronic device with the capacity to photograph or scan and send circular, two-dimensional, and other digital images to the digital image receiving component 122 of the image capture and action application 120. The service requester device 160, 170, 180 also has the capacity to engage in bilateral or multilateral voice and/or data sessions, the sessions being one of concurrent or consecutive. The service requester device 160, 170, 180 transmits a photographed digital image to access services associated with service offerings 132, 134, 136 offered by the service provider device 140. The service requester device 160, 170, 180 may be one of a mobile telephone, personal digital assistant (PDA), tablet computer, laptop computer, desktop computer, and desktop telephone containing functionality to scan or photograph and transmit digital images to the image capture and action server 110.

The service requester device 160, 170, 180 comprises a requester interface 162, 172, 182 that promotes requesting services associated with the system 100. The requester interface 162, 172, 182 comprises an image capture component 164, 174, 184 that scans or photographs digital images. The requester interface 162, 172, 182 also comprises a server interaction component 166, 176, 186 that transmits the digital image to the image capture and action server 110 and communicates with the image capture and action server 110 to create, maintain, and dismantle the session. This communication comprises exchanges with the image capture and action server 110 related to authentication, passing of security information, payment, and menu selections regarding session parameters. The communication also comprises the receipt and installation of software from the image capture and action server 110 before the session commences and any instructions or other transmissions regarding the uninstallation or removal of software from the service requester device 160, 170, 180 at the conclusion of a session. The requester interface 162, 172, 182 also comprises a session interaction component 168, 178, 188 that conducts the transmissions specific to a session, whether the session is voice or data. The transmissions may include voice or data exchanges with other service requester devices 160, 170, 180 or the service provider device 140. The transmissions may also include data exchanges with the image capture and action server 110 once a session has been commenced.

The network 190 promotes communication between the components of the system 100. The network 190 may be any communication network including a public data network (PDN), a public switched telephone network (PSTN), a private network, and/or a combination thereof.

The wireless base stations 192 and 194 may be any of a mobile telephone wireless base station, for example a Code Division Multiple Access (CDMA), Global System for Mobile Communications (GSM), and/or Universal Mobile Communications System (UMTS) mobile telephone wireless base station, a World-wide Interoperable Microwave Access (WiMAX) base station, a WiFi access point, or other wireless access device. The wireless base stations 192 and 194 are in communication with the image capture and action server 110, for example via wired communication links through the network 190.

Figure 2:
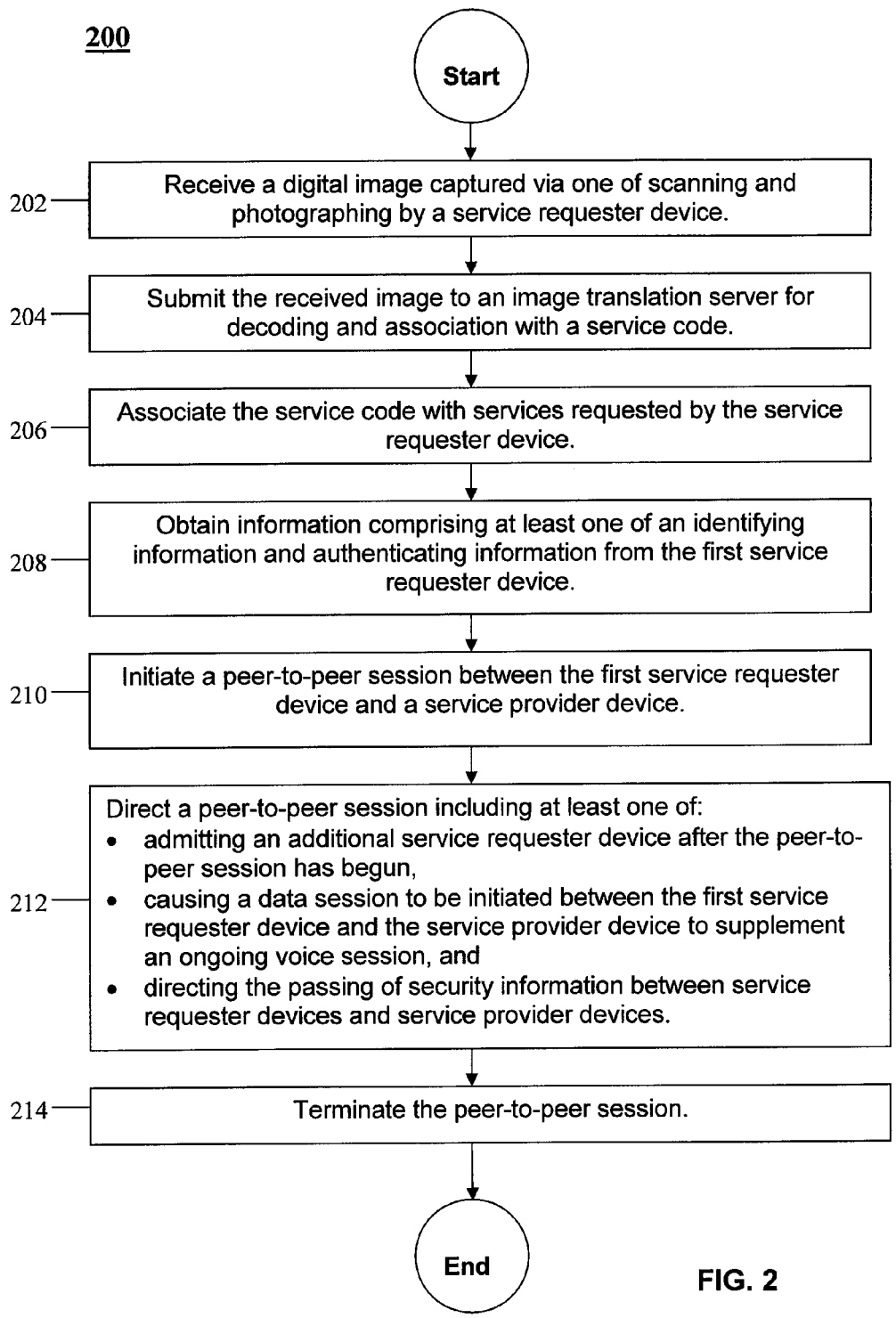
FIG. 2 is a flow chart illustrating a method according to an embodiment of the disclosure.

Turning now to FIG. 2, a method 200 for image capture and action is provided. Beginning at block 202, the digital image receiving component 122 receives a digital image from the image capture component 164, 174, 184. In an embodiment, the digital image is received by the digital image receiving component 122 in substantially the same format as it originally appeared when it was photographed or scanned by the image capture component 122. In another embodiment, the service requester device 160, 170, 180 may contain functionality that analyzes, interprets, or otherwise performs operations on the digital image before transmitting it that partially decodes the digital image and may add information that identifies the service requester device 160, 170, 180 and contains user preference or authenticating information. This additional functionality may expedite the translation by the image translation server 150. When the digital image receiving component 122 receives the digital image it also receives information providing the identity of the service requester device 160, 170, 180 and may also receive information about the type of device which is transmitting the digital image, the software already resident on the service requester device 160, 170, 180, and the capacity of the service requester device 160, 170, 180 to accept additional software.

At block 204, the image translation server interaction component 124 submits the digital image to the image translation server 150 for translation. The translation may comprise locating a symbol inside the digital image, correcting the digital image for distortion, acquiring raw data from the image, detecting edges of the image and/or symbol, determining geometry of the image and/or symbol, discarding non-relevant data, and other actions known to those skilled in the art. Once the digital image has been cleaned up, the image translation server 150 searches the images database 152 for an image file matching the received image. If successful, the images database 152 retrieves a service code corresponding to the matched image. The image translation server 150 passes the service code back to the image capture and action server 120.

At block 206, the services database interaction component 126 uses the service code corresponding to the received digital image to locate a service offering 132, 134, 136 in the services database 130. Service codes are associated with service offerings 132, 134, 136. Service codes function as the link between the service requester device 160, 170, 180 photographing and transmitting a digital image to request service and the service provider device 140 providing its services under the service offerings 132, 134, 136. The link between the service requester device 160, 170, 180 and available service offerings 132, 134, 136 may be established with a digital image and corresponding service code to trigger the image capture and action server 110 to locate, open, and read the identified service offering 132, 134, 136 and take any other steps before beginning the session.

At block 208, the image capture and action application 120 may transmit additional communication to the service requester device 160, 170, 180 asking for additional authenticating information or other information before the session may begin. This step may be optional depending on the services requested by the service requester device 160, 170, 180 and the requirements of the selected service offering 132, 134, 136 as specified by the service provider device 140. When digital images are distributed to students or other youthful participants to be used for access to a casual voice conference session or data chat session, further authentication may not be necessary other than the parties identifying themselves as they enter the session. When a prospective customer in a retail store photographs and transmits an image to access the retail chain's offsite support function, there may be no reason for the prospective customer to provide any authenticating or identifying information. By contrast, a service requester device 160, 170, 180 seeking to enter a secure building or join in a prearranged secure voice or data session enabled under a service offering 132, 134, 136 may be challenged to enter passwords or other authenticating or identifying information in addition to submitting a digital image that is qualified by the image capture and action server 110.

At block 210, the session initiation and management component 128 accesses the selected service offering 132, 134, 136 and initiates the session. The actions of the session initiation and management component 128 depend on the specific instructions in the selected service offering 132, 134, 136. The session initiation and management component 128 may contact the service provider device 140 first and advise that one of its service offerings 132, 134, 136 has been accessed by at least one of a qualified service requester device 160, 170, 180 and that a session is beginning. In the case of a group conference call, the service provider device 140 may be a telecommunications provider and it will be directed to open a conference bridge and begin receiving connections from participating service requester devices 160, 170, 180. When a secure business process is being launched or continued by the creation of a session, the service provider device 140 may be directed to distribute software applications or data to participating service requester devices 160, 170, 180 or send out notifications. The session initiation and management component 128 of the image capture and action application 120 may also perform some or all of these actions.

If the service requester device 160, 170, 180 is a prospective customer in a retail store seeking information, the service provider device 140 in this case may be the retail chain's customer support function. The session initiation and management component 128 will initiate the session by contacting the service provider device 140 and bringing it into a voice session with the service requester device 160, 170, 180 waiting in the store for assistance. If the service requester device 160, 170, 180 is attempting to gain access to a secure building, the building management company is the service provider device 140 and the session initiation and management component 128 will contact the service provider device 140, advise that a party is attempting to enter its building and may cause a secure virtual private network session to be created between the service provider device 140 and the service requester device 160, 170, 180.

At block 212, the session initiation and management component 128 manages the ongoing session as directed by the selected service offering 132, 134, 136. These actions may comprise admitting additional service requester devices 160, 170, 180 after the session has begun in the case of a group conference call, group data session, or a secure ad hoc multiparty session as described in a business arrangement enabled by the system 100. These actions may also comprise the building of a data session to run concurrent with a voice session to permit data to be exchanged between service requester devices 160, 170, 180 while they engage in a voice session. The service provider device 140 may also be involved in the exchange of data. Managing the ongoing session may also comprise the passing of additional security information between parties during the session to permit additional requests for service to be fulfilled as provided for in the selected service offering 132, 134, 136.

At block 214, the session initiation and management component 128 terminates the session pursuant to the intentions communicated by the parties and any related instructions contained in the selected service offering 132, 134, 136. These actions may comprise the orderly releasing of service requester devices 160, 170, 180 from their voice and/or data connections with the session. These actions may also comprise the recovery or removal of software or data from service requester devices 160, 170, 180. The service provider device 140 will also need to be released from the session at its conclusion. The session initiation and management component 128 may also publish and make a record of the session including a listing of participants and the events that occurred for record-keeping and accounting purposes. The session initiation and management component 128 may furnish a record of the session to the service provider device 140 to accompany an invoice from the image capture and action server 110 to the service provider device 140 for services rendered in the session. The record of the session may be useful to the service provider device 140 if the service offering 132, 134, 136 provides for the service provider device 140 to collect fees from the service requester devices 160, 170, 180 for services rendered in the session. The record of the session may be useful to both the service provider device 140 and the service requester devices 160, 170, 180 for their own record of their participation in the session.

In an embodiment, multiple service requester devices 160, 170, 180 may wish to engage in a group conference call for an ad hoc social or informal discussion. One of the service requester devices 160, 170, 180 may acquire a digital image from a service provider device 140 whose business is providing telecommunications services and in this embodiment provides secure call bridge services. The digital image may be linked to a service code in the images database 152. The service code corresponds to a service offering 132, 134, 136 stored in the services database 130. The service offering 132, 134, 136 in the embodiment is the call bridge service to be accessed by the service requester devices 160, 170, 180 when they scan the digital image to initiate the group conference call. The service provider device 140 in the embodiment has an arrangement with the image capture and action server 110 wherein the image capture and action server 110 handles the receipt and verification of digital images from the service requester devices 160, 170, 180 and directs the session. The service provider device 140 makes capacity available in its system to handle the conference session but is freed from the duties of tracking and verifying attendees and dealing with security issues.

The service requester device 160, 170, 180 may purchase the digital image from the service provider device 140 in a simple internet transaction and distribute the digital image to the other participating service requester devices 160, 170, 180 via electronic mail. In an embodiment, the digital image contains the information necessary for the group conference call to be initiated including the number and possibly the identity of participants allowed and the maximum duration of the conference. While in this embodiment service requester devices 160, 170, 180 engage in voice and/or data conferencing, in other embodiments the system 100 may permit the image capture and action application 120 and/or the service provider device 140 to stream media such as music, video, or other content to service requester device 160, 170, 180 during a session. The system 100 may permit the sequencing or joining of at least two already existing conference calls into a single, larger session.

Using the digital image reduces the need for a call-in number, passwords and other information necessary to conduct traditional teleconferences. The service requester device 160, 170, 180 merely photographs and transmits the digital image at the appointed time and is admitted into the conference call. The components of the image capture and action application 120 may be able to determine the identity of the service requester device 160, 170, 180 and no further authentication may be necessary. In an embodiment, the image capture and action server 110, the service provider device 140, and the image translation server 150 may be fully independent of one another. The role of the service provider device 140 in this embodiment is generally passive and limited. The image capture and action server 110 in an embodiment may receive payment from the service provider device 140 for aggregating the service requester devices 160, 170, 180 into conference sessions. The image capture and action server 110 may represent the service provider device 140 as a vendor or dealer on behalf of the service provider device 140 in distributing its services by selling digital images as an appointed agent of the service provider device 140. While the image capture and action server 110 may own or otherwise control the operation of the image translation server 150, in an embodiment the image translation server 150 may also be operationally and economically independent of the other components in the system 100 and be operated on a commercial basis and represent a plurality of vendors, some of whom may not be components of the system 100.

In another embodiment similar to the previous embodiment, service requester devices 160, 170, 180 may wish to engage in a group conference call that is driven by a business or political agenda wherein service requester devices 160, 170, 180 follow the steps of a contractual or parliamentary process, including submitting commentary and voting on proposals or in elections. In an embodiment, the image capture and action application 120 may distribute and gather software and data in orderly exchanges during the voice session in separate data sessions with the service requester devices 160, 170, 180. The service provider device 140 may also provide one or more internet links to service requester devices 160, 170, 180 for their access in reviewing information, voting, or otherwise interacting. In this embodiment, more security may be necessary. Photographing and submitting a digital image may need to be supplemented with the service requester devices 160, 170, 180 providing additional authentication to be admitted. As previously, the service provider device 140 may function in a largely passive role. Unlike the previous embodiment, the image capture and action application 120 may be more active in handling the transmission of materials and orchestrating the conduct of the session's agenda with participants.

In another embodiment, a service requester device 160, 170, 180 in a retail store may examine products on display and may seek information about a product that is beyond the readily-available technical knowledge of in-store personnel. A digital image is affixed to the store shelving or display for the product. The service requester device 160, 170, 180 photographs and transmits the digital image to a phone number associated with the image capture and action application 120. After the components of the image capture and action application 120 match and verify the digital image's link with the support service offering 132, 134, 136 associated with retail chain's product support function, the session initiation and management component 128 starts the session by contacting the service provider device 140, the retail chain's support unit. The service provider device 140 is joined in a voice session with the service requester device 160, 170, 180 which has been briefly standing by. The two parties engage in a voice conversation about the products on display and the service provider 140 may answer the questions asked by the service requester device 160, 170, 180.

In an embodiment, video cameras may be located throughout the retail store. In some locations, the service provider device 140 may be able to the control the operation of the video cameras to view the service requester device 160, 170, 180 in the store. The service provider device 140 may be able to zoom in on the service requester device 160, 170, 180, observe the user of service the requester device 160, 170, 180 handling a particular item, and be able to make suggestions and describe product features to the user of the service requester device 160, 170, 180. In the embodiment, the service provider device 140 may have access to store maps detailing the floor layouts and product display placements of all the individual stores in the retail chain's network. Using the in-store cameras and floor layout maps, the service provider device 140 may be able to direct the user of the service requester device 160, 170, 180 around the store to locate more suitable product models while the voice session is ongoing. During the session, the service provider device 140 may have access to online information about product inventory available at the store where the service requester device 160, 170, 180 is presently shopping, in a nearby store, or elsewhere in the retail chain's inventory or distribution network. Near real time access to this information may be critical to the service provider 140 in completing a sale transaction.

The image capture and action application 120 may initiate a concurrent data session between the service provider device 140 and the service requester device 160, 170, 180 enabling the service provider device 140 to send information on products to the service requester device 160, 170, 180 while the user of the service requester device 160, 170, 180 is in the store examining the products. The system 100 in this embodiment enables the retailer to simultaneously conduct a live voice conversation with a prospective customer, view the customer handling a displayed item, direct the customer's movements about the store, and furnish product information to the customer, all from a remote location. In an embodiment, the identity of the service requester device 160, 170, 180 may not be disclosed by the image capture and action application 120 to the service provider device 140.

In an embodiment involving a retail chain and a prospective customer in a retail store, the image capture and action application 120 may permit a service provider device 140 presently engaged in a voice or data session with a service requester device 160, 170, 180 to concurrently initiate a session involving the aforementioned video system within the retail store, a data session with the retail chain's inventory system to check availability, and a voice and/or data session with the product support system of a manufacturer of a product sold by the retail chain about which the service requester device 160, 170, 180 may have questions. These additional concurrent sessions may be manually invoked by the service provider device 140 during the primary voice session with the service requester device 160, 170, 180. The additional sessions may alternatively be driven at least in part by the content of the digital image initially scanned so as the service provider device 140 needs access to these additional sessions, they are near-instantly at hand.

In another embodiment, a user of the service requester device 160, 170, 180 is seeking to gain entry into a secure building or other property. The landlord, property manager, or security firm that controls access to the building is the service provider device 140 in this embodiment. A digital image may be affixed to the exterior of building near the entrance that the user of the service requester device 160, 170, 180 seeks to access. The service requester device 160, 170, 180 uses a mobile telephone or other communications device to photograph and submit the digital image to the image capture and action application 120. The digital image is received by the digital image receiving component 122 and passed to the image translation server interaction component 124 for verification with the image translation server 150.

When the digital image is matched with a corresponding file in the images database 152, a service code is passed to the services database interaction component 126 which searches the services database 130 and locates the service offering 132, 134, 136 corresponding to the security services the service provider device 140 is making available through the system 100. In the embodiment the service provider device 140 may authenticate the service requester device 160, 170, 180 before granting entry into the property. The image capture and action application 120 may make contact with the service requester device 160, 170, 180 to request authenticating information before engaging the service provider device 140 and formally beginning the session. When authenticating information and other information that meets the requirements of the service provider device 140 as described in the service offering 132, 134, 136 has been gathered from the service requester device 160, 170, 180, the image capture and action application 120 may begin the session.

The session initiation and management component 128 engages the service provider device 140, advises that a service requester device 160, 170, 180 seeks to gain entry into a property under the management of service provider device 140 and has submitted a digital image and otherwise been prescreened for entry into the property. The image capture and action application 120 may then cause a session in the form of a secure virtual private network (VPN) session to be created between the service provider device 140 and the service requester device 160, 170, 180. In the session, the parties may communicate securely and exchange additional authenticating information. In the environment, the service provider device 140 or the image capture and action application 120 may cause a software application to be pushed to and installed on the service requester device 160, 170, 180. The software application is used by the service requester device 160, 170, 180 to review options for accessing the building and services therein, choose options, and enter further authenticating and other information required by the service provider device 140. The service provider device 140 grants entry to the building to the service requester device 160, 170, 180 when adequate authenticating and other information has been submitted to the software application over the virtual private network session.

In a similar embodiment, the service provider device 140 may use the system 100 to restrict access to building areas and services when the service requester device 160, 170, 180 is already inside the building. Images may be affixed at elevator banks, inside elevator cars, at entrances to secure areas of buildings, inside individual rooms, and at other locations within a facility to restrict entrance or access to services by service requester devices 160, 170, 180. The service provider device 140 may wish to restrict the ability to change lighting, temperature, and music settings in an area or room to certain parties. A service requester device 160, 170, 180 seeking to enter a restricted area or make changes to lighting, temperature, and music settings in an area or room may be required to photograph the digital image and follow most or all of the steps described in the previous embodiment regarding entry into a secure building.

The use of the system 100 by a landlord, property manager, or security agency to limit access to buildings, areas of buildings or changes to lighting, temperature, and music settings in an area or room allows a service provider device 140 to exercise this control and protection without distributing and tracking the possession of physical keys, security badges, or cards. The service provider device 140 can also tailor levels of access for different classes of service requester devices 160, 170, 180 and has the flexibility to change access parameters at any time.

Figure 3:
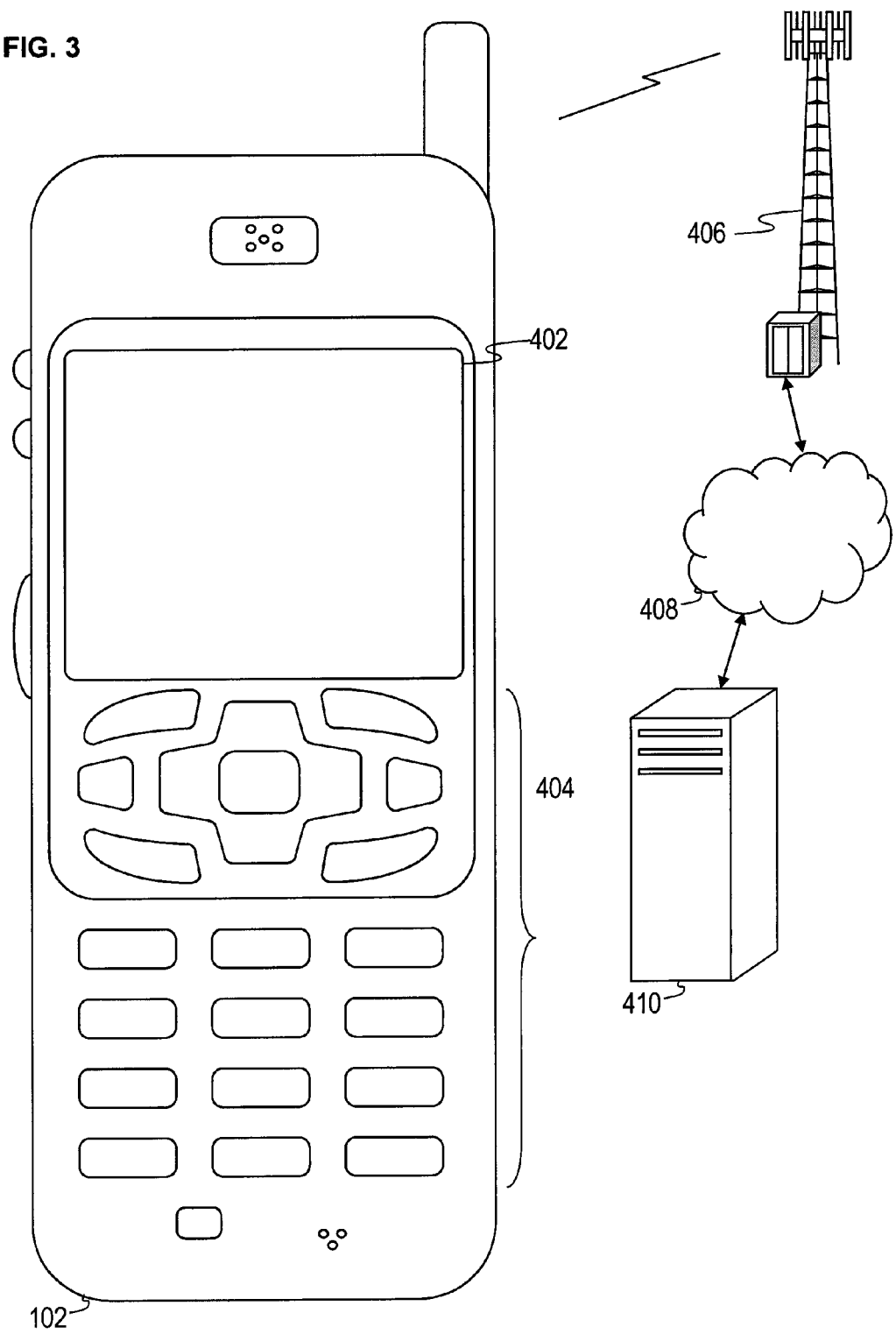
FIG. 3 is an illustration of a mobile device according to an embodiment of the disclosure.

FIG. 3 shows a wireless communications system including the handset 102. FIG. 3 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 402 to show a web page. The web page may be obtained via wireless communications with a mobile telephone tower 406, a wireless network access node, a peer handset 102 or any other wireless communication network or system. The mobile telephone tower 406 (or wireless network access node) is coupled to a wired network 408, such as the Internet. Via the wireless link and the wired network 408, the handset 102 has access to information on various servers, such as a server 410. The server 410 may provide content that may be shown on the display 402. Alternately, the handset 102 may access the mobile telephone tower 406 through a peer handset 102 acting as an intermediary, in a relay type or hop type of connection.

FIG. 4 shows a block diagram of the handset 102. While a variety of known components of handsets 102 are depicted, in an embodiment a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a mobile telephone network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 102 to be used as a mobile telephone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than charge coupled device cameras may be employed. Various other peripherals may also be included to provide additional functions, e.g., radio and television reception.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 5 are a web browser application 608, a media player application 610, and JAVA applets 612. The web browser application 608 configures the handset 102 to operate as a web browser, allowing a user to enter information into forms and select links to retrieve and view web pages. The media player application 610 configures the handset 102 to retrieve and play audio or audiovisual media. The JAVA applets 612 configure the handset 102 to provide games, utilities, and other functionality. The user interface 614 corresponds to the requester interface 162, 172, 182 described as components of the system 100.

Figure 6:
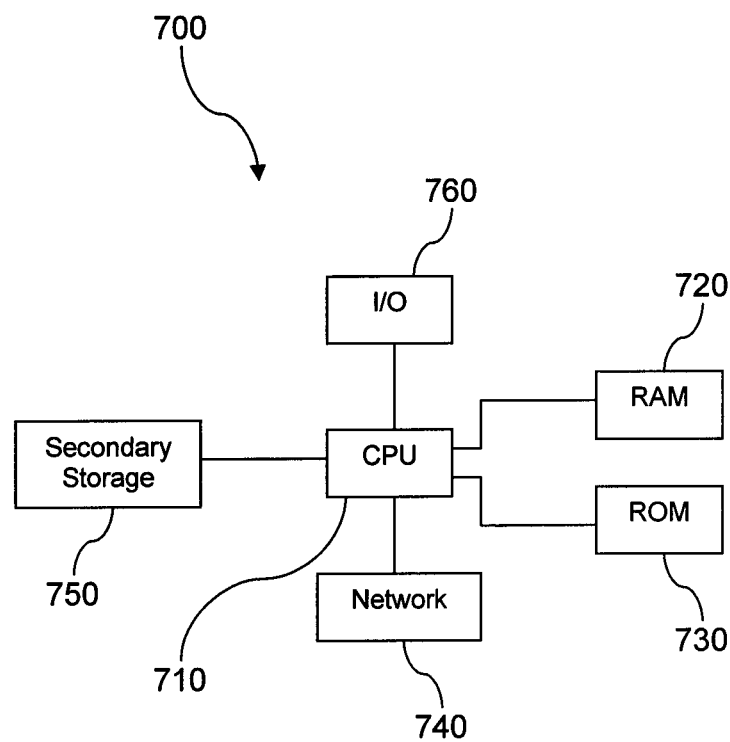
FIG. 6 illustrates an exemplary general purpose computer system suitable for implementing some of the aspects of the several embodiments of the disclosure.

Aspects of the system 100 described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor may be implemented as one or more CPU chips.

The secondary storage 750 is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 750. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 740 may enable the processor 710 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave.

Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 710 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
    an at least one computer system;
    a services database; and
    an application that, when executed on the at least one computer system,
        receives a message from a service requestor to initiate a request for service, the message containing digital image,
        transmits an image translation request that includes the digital image to an image translation server,
        receives from the image translation server service code corresponding to an image that matches the digital image, and
        initiates an ongoing communication session between the service requestor and a service provider that provides the service that is associated with the service code in the services database.

2. The system of claim 1, wherein the digital image is one of a barcode, circular barcode, two dimensional barcode, data matrix, and maxicode.

3. The system of claim 1, wherein the services database stores information about a plurality of communication services.

4. The system of claim 1, wherein the system validates the services based at least on a subscriber identity wherein the subscriber identity is contained by the message.

5. The system of claim 1, wherein the services database stores information about services for gaining access to secure property.

6. The system of claim 1, wherein the application, when executed on the at least one computer system, further:
    validates the services to be provided associated with the service code based on information in the services database, wherein the ongoing communication session is initiated when validation succeeds.

7. The system of claim 1, wherein the ongoing communication session between the service requestor and the service provider is a voice communication session.

8. A system, comprising:
    a server that hosts an image capture and action application;
    wherein the server promotes communication services,
    wherein the image capture and action application is executable by the server to electronically receive a digital image from a service requestor device, the digital image captured by the service requester device,
    wherein the image capture and action application is further executable by the server to transmit a translation request that includes the digital image to an images server, receive from the images server a service code corresponding to an image that matches the digital image, and associate the service code with a communication service offered by a service provider device, and
    wherein the image capture and action application is further executable by the server to initiate at least one of an ongoing voice session and an ongoing data session between the service requester device and the service provider device.

9. The system of claim 8, wherein the image capture and action application detects the hardware type of the service requester device and the firmware and software installed on the service requester device.

10. The system of claim 8, wherein the service requester is one of a mobile telephone and a personal digital assistant (PDA).

11. The system of claim 8, wherein the service requester device specifies date and time for commencement of the one of the ongoing voice session and the ongoing data session.

12. The system of claim 8, wherein the image capture and action application issues security keys to the service requester device.

13. The system of claim 8, wherein the image capture and action application pushes at least one of a software application and a data to the service requester device for use in a business process.

14. The system of claim 8, wherein the image capture and action application promotes streaming of media to the service requester device.

15. A method of providing communication services, comprising:
- receiving a digital image captured via one of scanning and photographing by a service requester device;
- submitting the digital image to an image translation server for decoding and associating with a service code;
- associating the service code with services requested by the service requester device;
- obtaining information comprising at least one of an identifying information and authenticating information from the service requester device;
- initiating a session between the service requester device and a service provider device;
- directing the session including at least one of admitting an additional service requester device after the session has begun, causing a data session to be initiated between the service requester device and the service provider device to supplement an ongoing voice session, and directing the passing of security information between the service requester device and the service provider device; and
- terminating the session.

16. The method of claim 15, wherein the image capture and action application arranges a group conference call between the service requester device and at least two other service requester devices.

17. The method of claim 15, wherein the service provider device is associated with a chain of retail stores and the service requester device seeks at least one of a voice and data session with the service provider device while visiting one of the retail stores associated with the service provider device.

18. The method of claim 15, wherein the service provider device is associated with a property management entity and the service requester device seeks to enter a property or access a restricted service associated with a property managed by the property management entity.

19. The method of claim 18, wherein the service provider causes a software application to be installed on the service requester device to facilitate the utilization of the services provided by the service provider device and at the conclusion of the session the service provider device causes the application to be uninstalled from the service requester device.

20. The method of claim 15, wherein the image capture and action application promotes a data-only session between the service provider device and at least two service requester devices.

* * * * *